United States Patent [19]

Harrison

[11] 4,106,101
[45] Aug. 8, 1978

[54] TYPEWRITER-CALCULATOR COMBINATION FOR THE PHYSICALLY DISABLED

[75] Inventor: Leslie Herbert Raymond Harrison, Wimborne, England

[73] Assignee: Possum Controls Limited, England

[21] Appl. No.: 746,606

[22] Filed: Dec. 1, 1976

[51] Int. Cl.² .......................... G06F 3/02; G06F 3/10
[52] U.S. Cl. .................................. 364/709; 364/710; 364/900
[58] Field of Search ............... 235/152, 156, 159, 160, 235/164, 168; 364/200, 900, 709, 710; 197/DIG. 7

[56] References Cited

U.S. PATENT DOCUMENTS

| 3,265,874 | 8/1966 | Soule, Jr. et al. | 235/159 |
| 3,920,979 | 11/1975 | Kilby et al. | 235/168 |
| 3,973,111 | 8/1976 | Washizuka et al. | 235/156 |
| 4,006,463 | 2/1977 | Hanks | 364/200 |

*Primary Examiner*—David H. Malzahn
*Attorney, Agent, or Firm*—Robert F. O'Connell

[57] ABSTRACT

To enable a severely disabled person to use an electric typewriter for arithmetic calculations an electronic calculator is coupled to the printing mechanism of the typewriter through a selector whereby the transmission of the output of the calculator to the printing mechanism can be permitted or prevented. To simulate the key-signals normally used for the calculator, a simulator circuit is coupled to the control apparatus provided for enabling a disabled person to use the typewriter and simulates key-signals in response to commands from such control apparatus. One or more infrequently used signals from the control apparatus are employed as special signals to operate the selector to permit print-out of the calculator output when required.

4 Claims, 10 Drawing Figures

NOTES
ALL THESE SWITCHES ARE ¼ '016 MOTOROLA CONNECTIONS

TYPEWRITER-CALCULATOR COMBINATION FOR THE PHYSICALLY DISABLED

The present invention relates to electronic, numerical calculators.

Over recent years considerable progress has been made in aids for severely disabled people whereby, despite severe disability such as paralysis, they are now able to carry out various tasks previously denied to them.

In one development, first disclosed and described in United Kingdon patent specification No. 1,021,531, control apparatus is provided whereby a severely disabled person is able to operate an electric typewriter by means of a switch or switches controlled by breathing into a tube or by small residual movements of, for example, a toe or finger.

Also over recent years electronic calculators, commonly known as "pocket calculators", have come into very extensive use.

It is not possible for a severely disabled person to use such pocket calculators and it is the primary object of the recent invention to provide apparatus whereby a severely disabled person can operate electronic calculator apparatus through the same controls as he or she uses for operating an electric typewriter and have the numerical data and the results of the calculations typed by the typewriter to provide what is known as "hard copy".

It will be appreciated that a conventional pocket calculator does not provide "hard copy" and hence another object of the invention is to provide an electric typewriter and calculator combination whereby hard copy can be provided.

According to the present invention there is provided a source of character-signals coupled to the printing mechanism of an electric typewriter and to an electronic calculator and control apparatus therefor, the control apparatus comprising a selector in a circuit between the output of the calculator and the said printing mechanism whereby the transmission of the output of the calculator to the said printing mechanism can be selectively enabled or inhibited, a key-simulator responsive to character-signals from the said source and representative of numerical data and operational commands for simulating calculator-key-signals and applying such signals to the calculator, and means responsive to at least one predetermined command signal from the said source for operating the said selector to permit the said printing mechanism to print the output of the calculator. The source of character signals can be control apparatus as aforesaid for enabling a severely disabled person to operate an electric typewriter or it can be the typewriter keyboard itself. Thus whenever the typewriter is used for typing normal text any numerical character-signals and operational command signals (such as (+) (−) (×) (÷)) which happen to appear in the text will be fed through the simulator to the calculator but the calculator will not compute in response to them. When it is desired to use the calculator it is first of all cleared by the operator sending a "clear" signal. On pocket calculators this is normally shown on the "Clear" key by the letter C. The same letter can therefore conveniently be used in this invention for this purpose. Having cleared the calculator the operator then causes numerical and operational command signals to be generated by the source in accordance with a calculation to be made. These are fed through the key-simulator into the calculator and at the same time are printed by the printing mechanism of the typewriter. When the data for a simple calculation such as the addition of two numbers has been fed into the calculator, a predetermined character-signal is caused to be generated by the source which in turn causes the calculator to compute in accordance with the data and cuases the selector to permit the result to be printed by the printing mechanism of the typewriter. The predetermined signal for this purpose is conveniently called "Answer" and is selected from the infrequently used characters of the typewriter such as, for example, the signal for an asterisk (*) or one of the fractions. Sometimes, when carrying out more complex calculations it is desired to check the number appearing at the output of the calculator without causing it to complete the calculation on which it has been instructed. For this purpose another predetermined command signal conveniently called "Read" (and again selected from the infrequently used characters of the typewriter) is used and in response to which the control apparatus causes the output of the calculator to be printed as it stands. A third predetermined command signal the "Equals" (=) signal may also be used for completing an intermediate stage of calculation but without causing the result to be printed by the typewriter.

Thus by means of the invention the normal function facilities of a pocket calculator are provided and the typewriter will type the data and the answers.

The invention will now be described, by way of example, with reference to the accompanying drawings in which.

Figure 1:
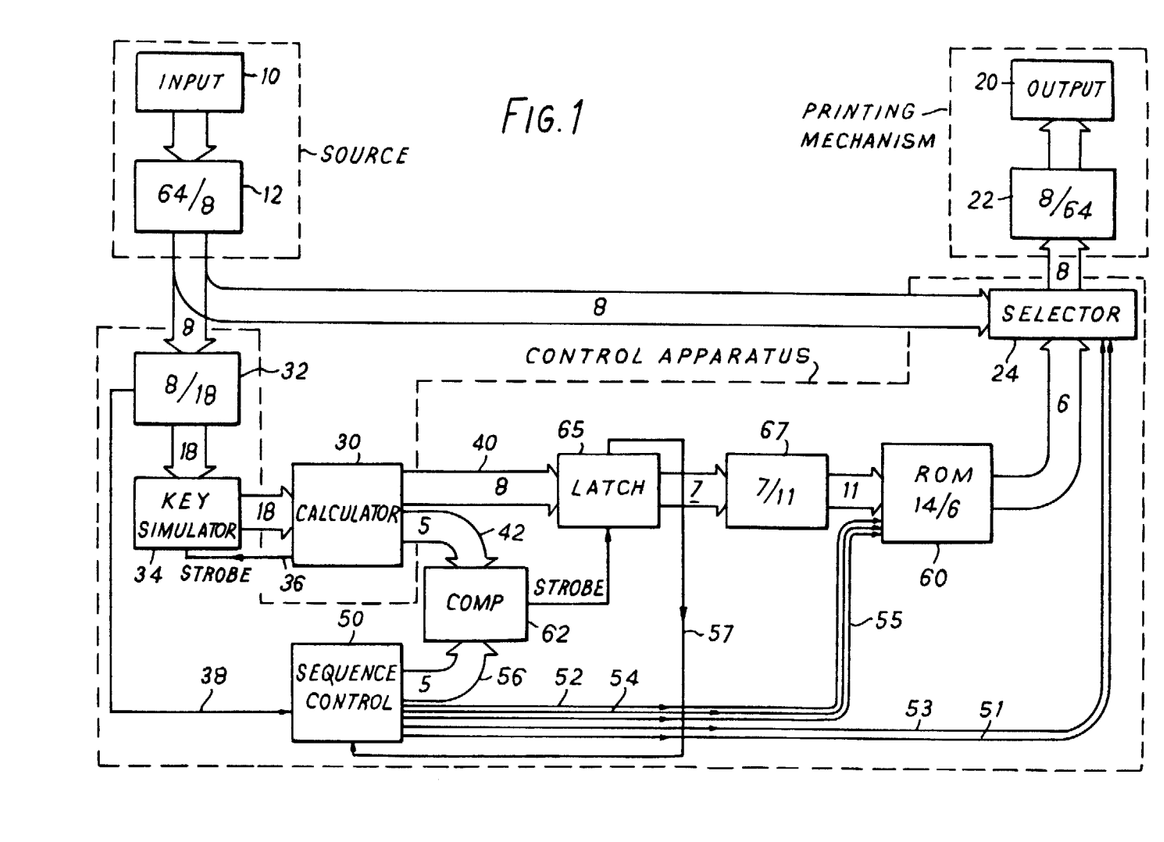
FIG. 1 is a block schematic diagram of one embodiment.

Referring to FIG. 1 this is a block diagram of one embodiment of the invention and has four principal sections of which the first is indicated within broken lines as "SOURCE" and constitutes a source of character-signals such as the keyboard of an electric typewriter or apparatus as aforesaid for enabling a severely disabled person to operate an electric typewriter. The second is indicated within broken lines with the legend "PRINTING MECHANISM" and constitutes the printing mechanism of an electric typewriter. The third is the block 30 with the legend "CALCULATOR" which is provided by the main integrated circuit of a conventional pocket calculator. The fourth is indicated within broken lines with the legend "CONTROL APPARATUS" and constitutes the control apparatus whereby the calculator 30 can be controlled from the "SOURCE" and its output printed by the "PRINTED MECHANISM".

In the SOURCE a block 10 represents an input selectiondevice of a typewriter having facilities whereby up to 64 different character selections can be made. The 64 outputs are applied to a conventional code-converter 12 for converting the 64 possible selections into a six-bit binary code on six parallel outputs with two extra parallel outputs to control the timing of character printing by the PRINTING MECHANISM. Thus the converter 12 is shown as a 64/8 converter.

The eight-lead output of the SOURCE is connected to the CONTROL APPARATUS and in normal operation is applied through a SELECTOR therein to the PRINTING MECHANISM. This includes a further code-converter 22 for converting the binary signals from the converter 12 back into signals on 64 outputs and suitable for operating the printing mechanism proper shown as OUTPUT 20.

A simple pocket calculator has a keyboard with 18 keys to provide inputs to the calculator corresponding to the digits 0 to 9, decimal point (full stop), the arithmetic operations (+), (−), (×), (÷), (=) and C (clear) and K (constant). To simulate any selected one of these 18 different key inputs a simulator is provided including another converter 32 which, in response to any one of the corresponding 18 signals from the SOURCE in binary code provides an output on the appropriate one of 18 different outputs. These are applied to solid-state switches in the block 18 which deliver the simulated key-signals to the calculator 30. Thus to operate the calculator the command signal C is first of all selected at the SOURCE which clears any data that may already be in the calculator 30. The operator then operates the source to generate signals corresponding to a calculation to be made. These signals are applied through the selector 24 to the PRINTING MECHANISM which prints the data and at the same time they are fed through the key simulator 32, 34 into the calculator 30.

As is usual for calculator circuits, and as is shown later, many of the conductors leading to the calculator 30 serve as both input and output leads in alternation at a strobe rate, but for convenience in FIG. 1 the calculator 30 is shown with 18 inputs and 14 outputs. The 18 inputs are, as already described, from the key-simulator 32, 34. The 14 outputs are divided into a set 40 of 7-segment outputs plus a decimal point output as would normally be employed for operating a seven-segment display of a pocket calculator; a set 42 of five control outputs as would normally be employed in a pocket calculator for selecting the position in the display of a digit to be displayed; and an entry strobe 36.

The converter 32 has an extra output lead 38 leading to a sequence controller 50 and it is arranged that signals appear on the lead 38 only when one of the predetermined character-signals "Answer", "Read" or "=" is caused to be generated by the SOURCE. The characters corresponding to these signals are not simultaneously printed by the PRINTING MECHANISM but set the sequence controller 50 into operation.

Assume that numerical data and an arithmetic operation command has been fed into the calculator 30 as hereinbefore described. If now the character-signal "Answer" is fed from the SOURCE the sequence-controller functions as follows:

A signal is transmitted from the controller 50 along a lead 51 to the selector 24 and sets the selector 24 to respond to the output of the calculator 30 instead of the SOURCE. A PRINT command signal is fed from the controller 50 along a lead 53 through the selector 24 to the PRINTING MECHANISM whereby the PRINTING MECHANISM is instructed to print. A further signal is conveyed from the controller 50 along a lead 54 to a READ ONLY MEMORY (ROM) 60 to indicate a space which is converted by the ROM 60 into the appropriate binary signal for a space which is executed by the PRINTING MECHANISM. Yet another signal is sent on a line 55 from the controller 50 to the ROM 60 to indicate the symbol "=". This is converted by the ROM 60 into the appropriate binary code and applied through the selector 24 to the PRINTING MECHANISM which prints the "=" sign. Finally as is common in pocket calculators the calculator will not compute until the "=" command signal is fed to it. For this purpose it is arranged that when the converter 32 receives the character-signal "Answer" it generates the "=" signal on the appropriate one of its 18 outputs and this is fed through 34 to the calculator 30. The apparatus is now ready to read and print the computed output of the calculator 30.

To do this the sequence controller 50 selects the first digit of the calculator output by setting into a comparator 62 through 56 a set of pulses indicative of "Digit No. 1" and corresponding to "Digit No. 1" pulses from the calculator through 42. When this occurs the comparator provides a strobe signal into a eight-bit latch 65 in which the calculator output has been stored in a seven-segment code plus a decimal point for the first digit. The seven-segment output of the latch is converted by a decoder 67 to a "1 in 11" code (to indicate the 10 digits 0 to 9 and minus sign) and applied through the ROM 60 and selector 24 to the PRINTING MECHANISM. A signal indicative of "decimal point" if applicable is applied from the latch 65 through 57 to the sequence controller 50 in response to which it transmits a "decimal point command" signal through 52 to the ROM 60 which in turn causes a decimal point to be printed by the PRINTING MECHANISM.

Assume now that numerical data and an arithmetic command signal have been fed into the calculator 30. If then the "=" command signal is caused to be generated by the SOURCE the key-simulator responds thereto and applies a simulated "=" signal to the appropriate one of the 18 inputs to the calculator which carries to the computation. No print-out occurs and further data and commands can be fed to the calculator.

If at any time it is desired to know or to check the number at the output of the calculator the charactersignal "Read" is caused to be generated by the source. In response to this signal the same steps occur as in response to the character-signal "Answer" except that no "=" simulation occurs in the key-simulator and hence the output of the calculator as it stands is printed by the PRINTING MECHANISM.

From the foregoing description in conjunction with FIG. 1 a person skilled in the art could readily design and construct a working example. However for completeness and to avoid the need for design a detailed diagram of a working example which has been built and tested is shown in FIGS. 2A to 2F which are to be assembled as shown by FIG. 3 with leads ending at margins of the drawings connected with corresponding leads at the margins of adjacent drawings. In FIGS. 2A to 2F so arranged assemblies of parts corresponding to the numbered blocks in FIG. 1 are enclosed in broken lines with corresponding reference numbers but for convenience some of them such as the sequence controller 50 are disjointed as indicated in FIGS. 2A, 2B, 2C, 2D and 2E. Throughout FIGS. 2A to 2F all integrated circuits (IC's) except the IC's 27 and 28 (FIG. 2D) are of the CMOS 4000 Series. The IC's 27 and 28 are of the TTL 7400 Series. All symbols for components such as gates, transistors, amplifiers etc. are in accordance with the convention current in the USA at the date of this application. The transistor switches in the block 34 (FIG. 2C) are each one quarter of the MOTOROLA type 016 as indicated in the explanatory note alongside FIG. 3 which is covered by FIG. 2C when FIGS. 2A to 2F are assembled as indicated by FIG. 3. All transistors are of the type BC183 except for the few which are marked otherwise — e.g. TR3 in the power supply (FIG. 2D) which is TIP 31A with heat sink.

Figure 2A:
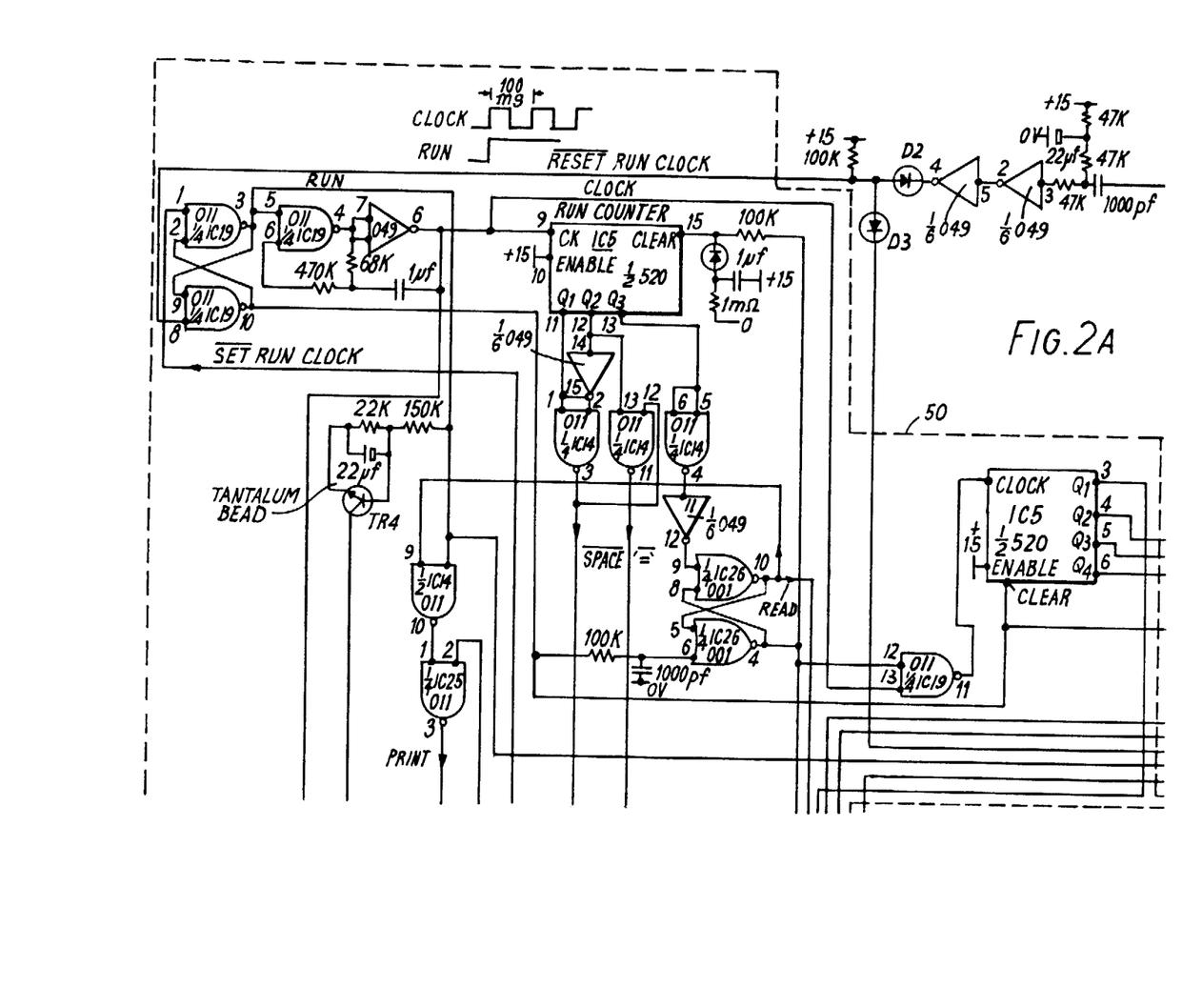
FIGS. 2A to 2F when assembled as shown in FIG. 3 is a detailed circuit diagram of the embodiment of FIG. 1, and FIGS. 4 and 5 are explanatory timing diagrams of pulses in the circuits of FIGS. 2A to 2F.
Figure 2B:
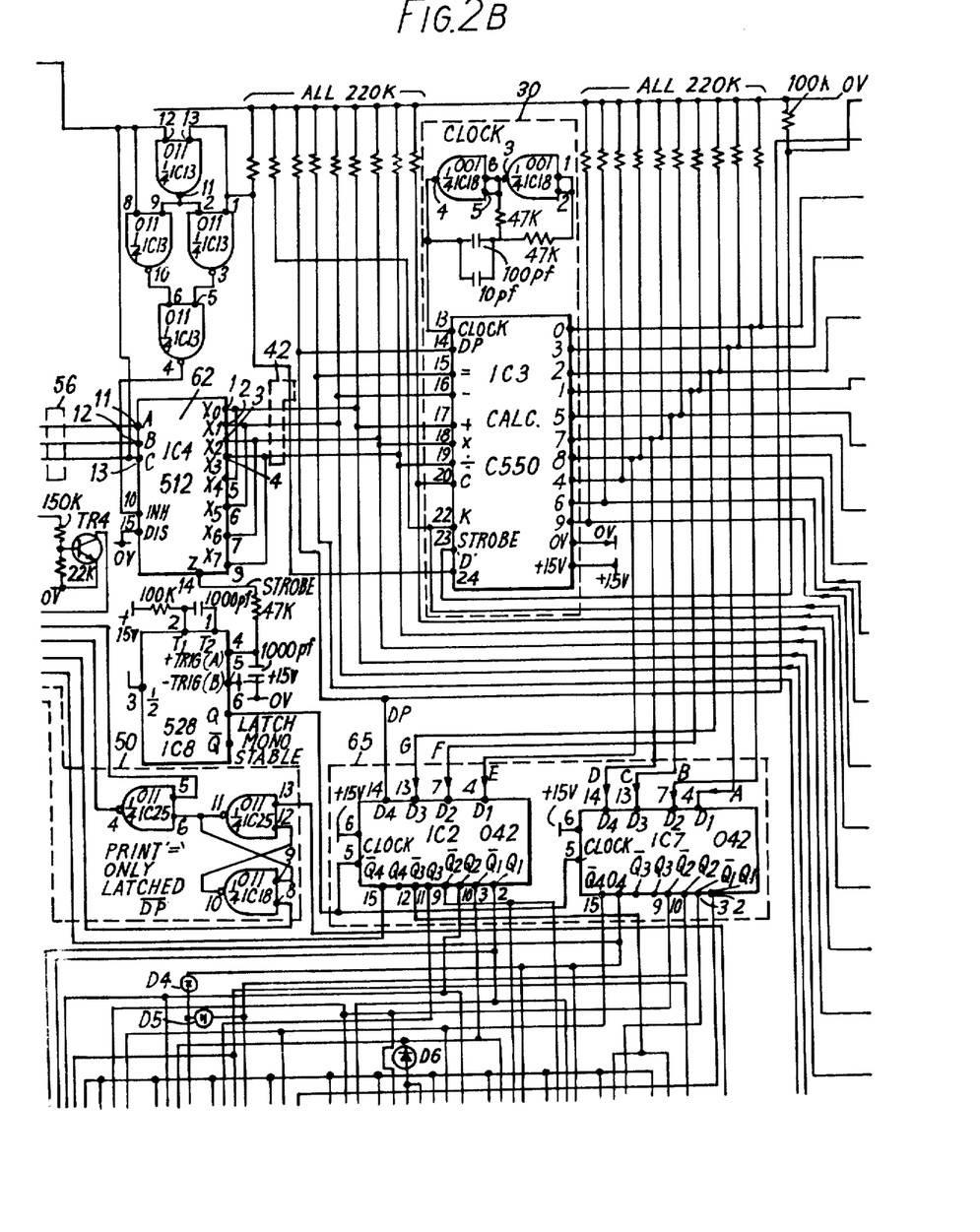
Figure 2C:
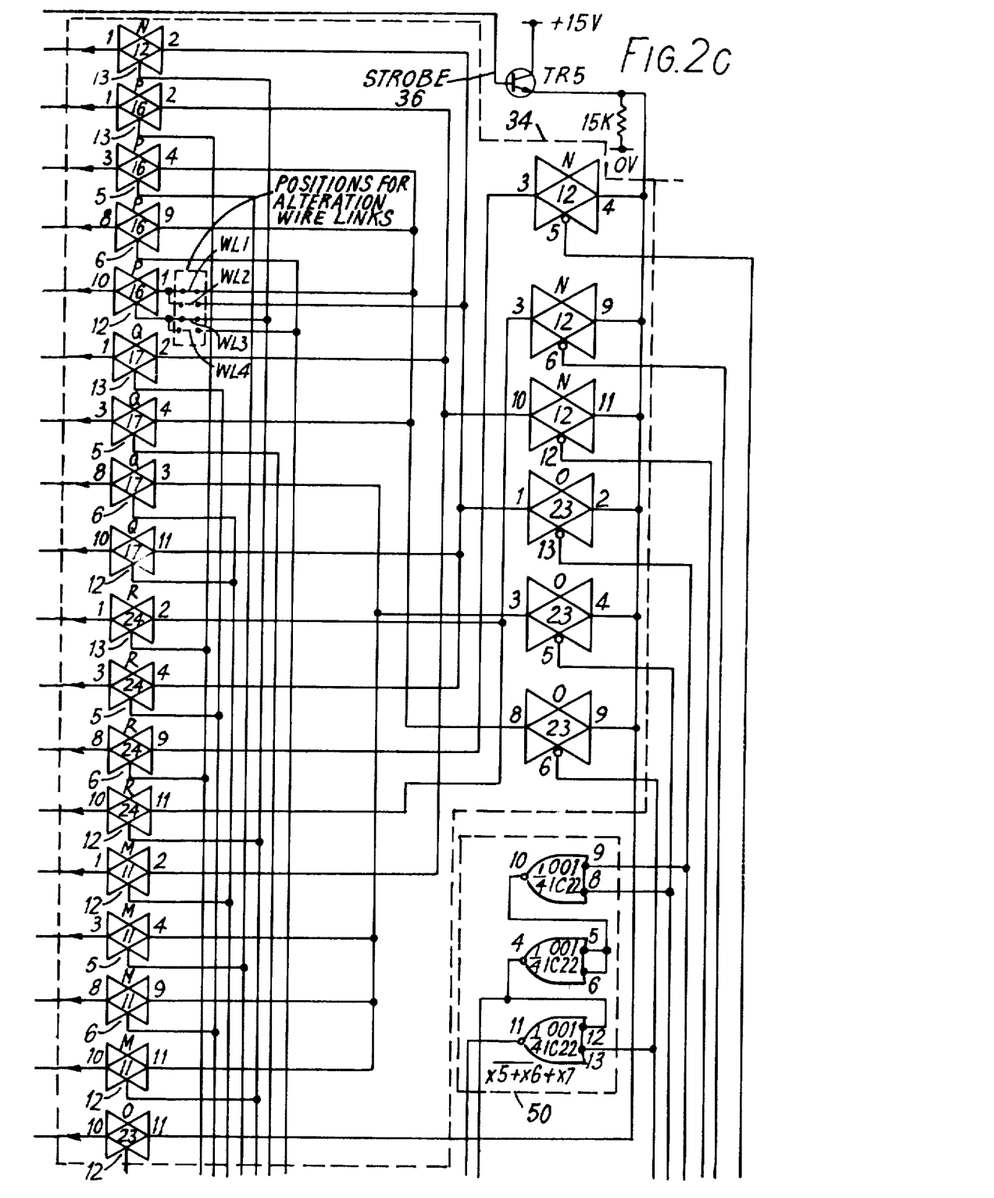
Figure 2D:
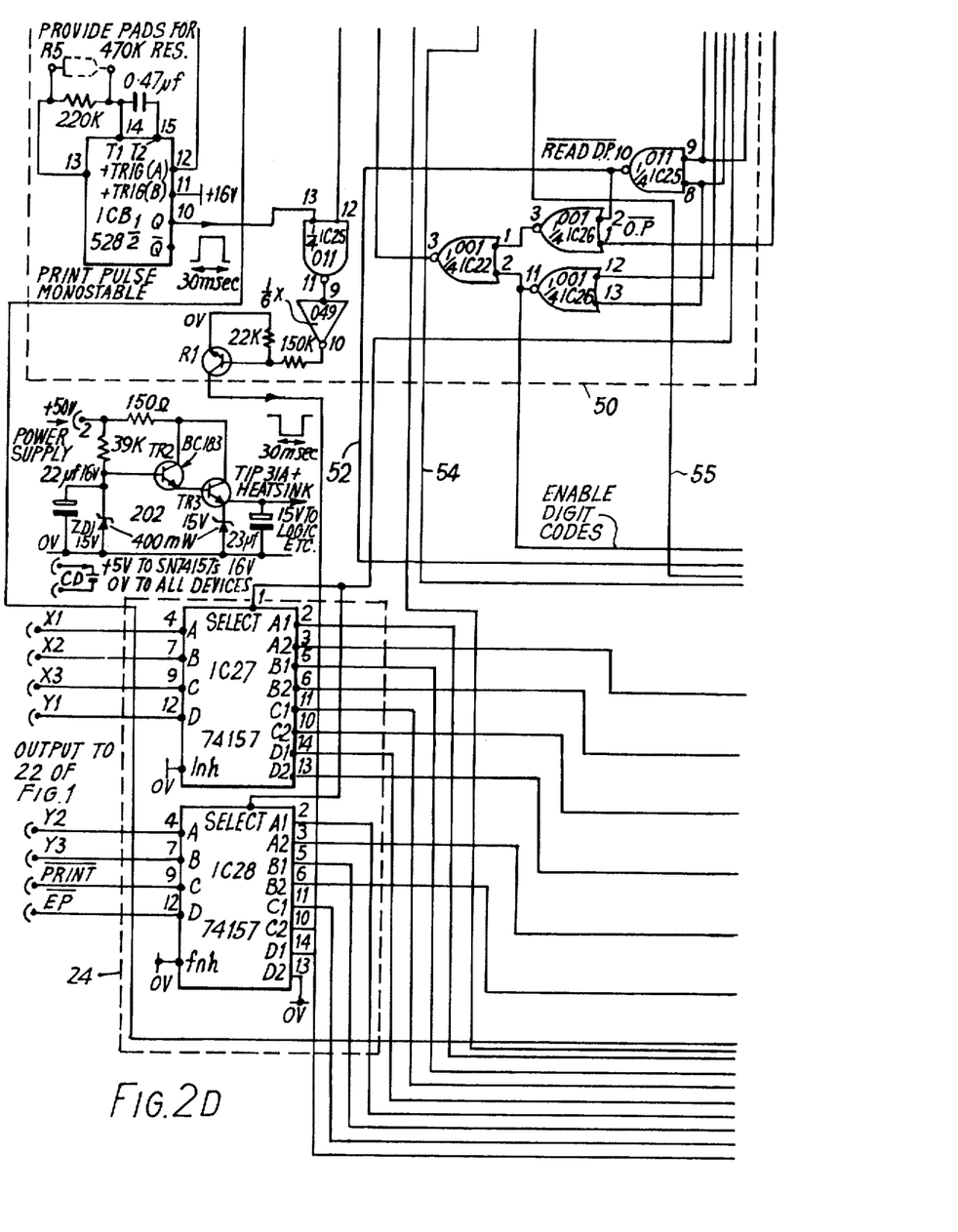
Figure 2E:
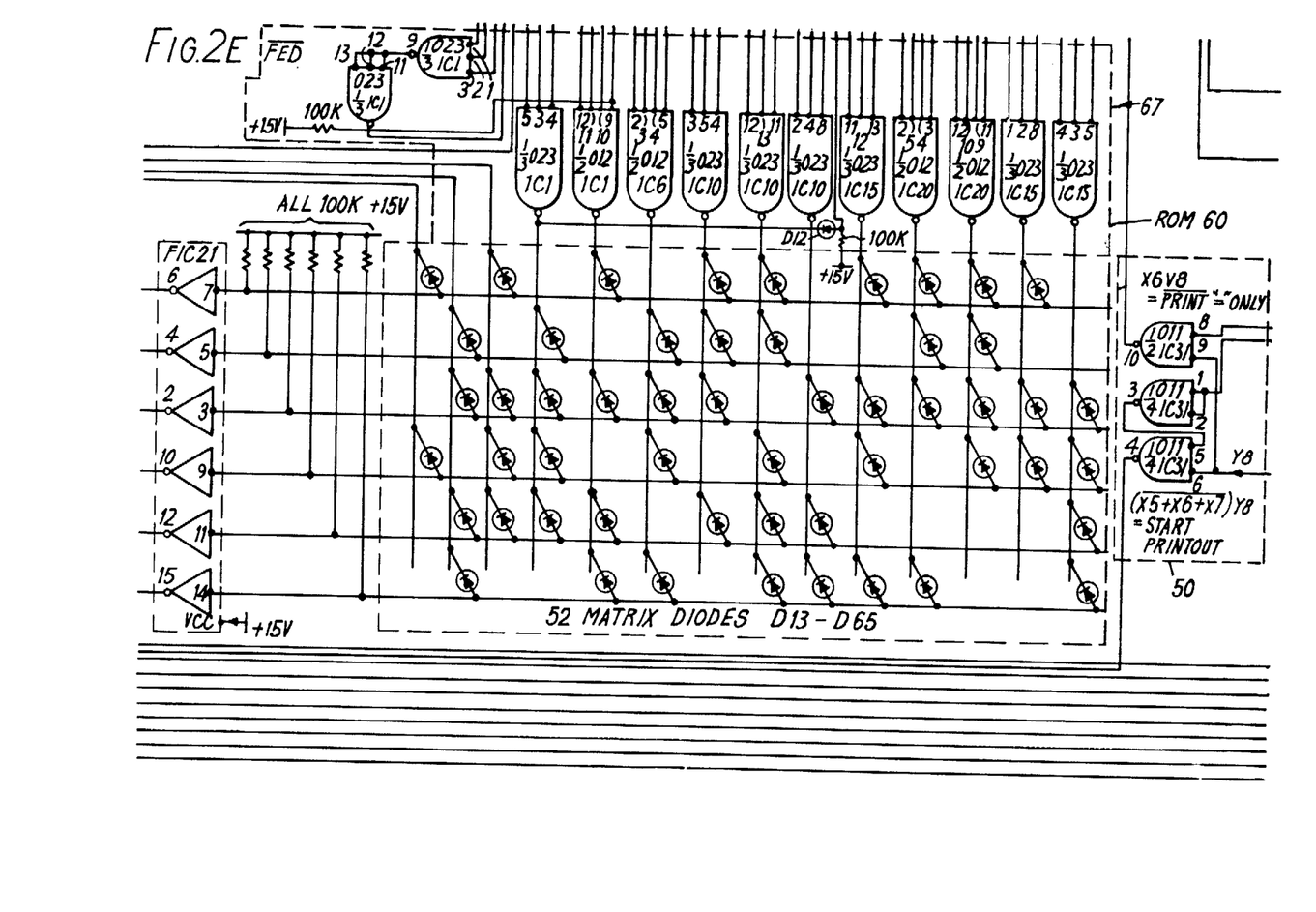
Figure 2F:
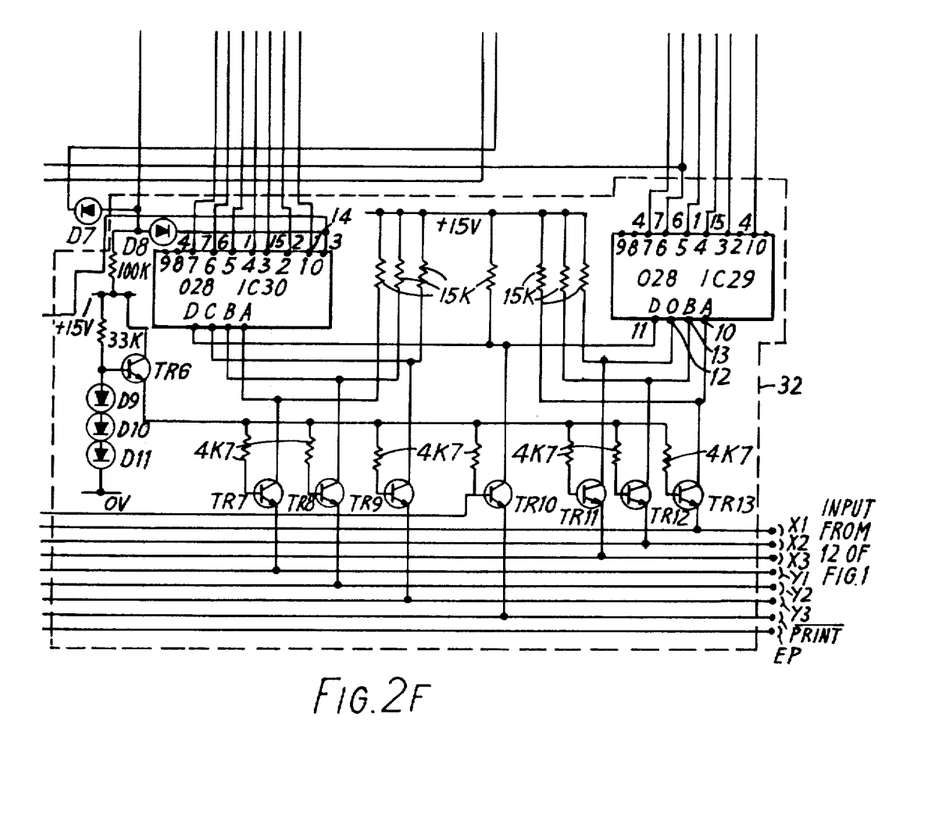
Figure 3:
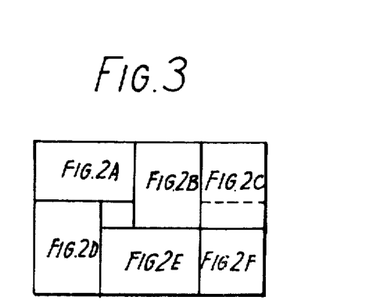

In FIGS. 2A to 2F the inputs are from the converter 12 of FIG. 1 as shown at the bottom right-hand corner of FIG. 2F and the outputs to the converter 22 of FIG. 1 are as shown at the bottom left-hand corner of FIG. 2D.

Figure 4:
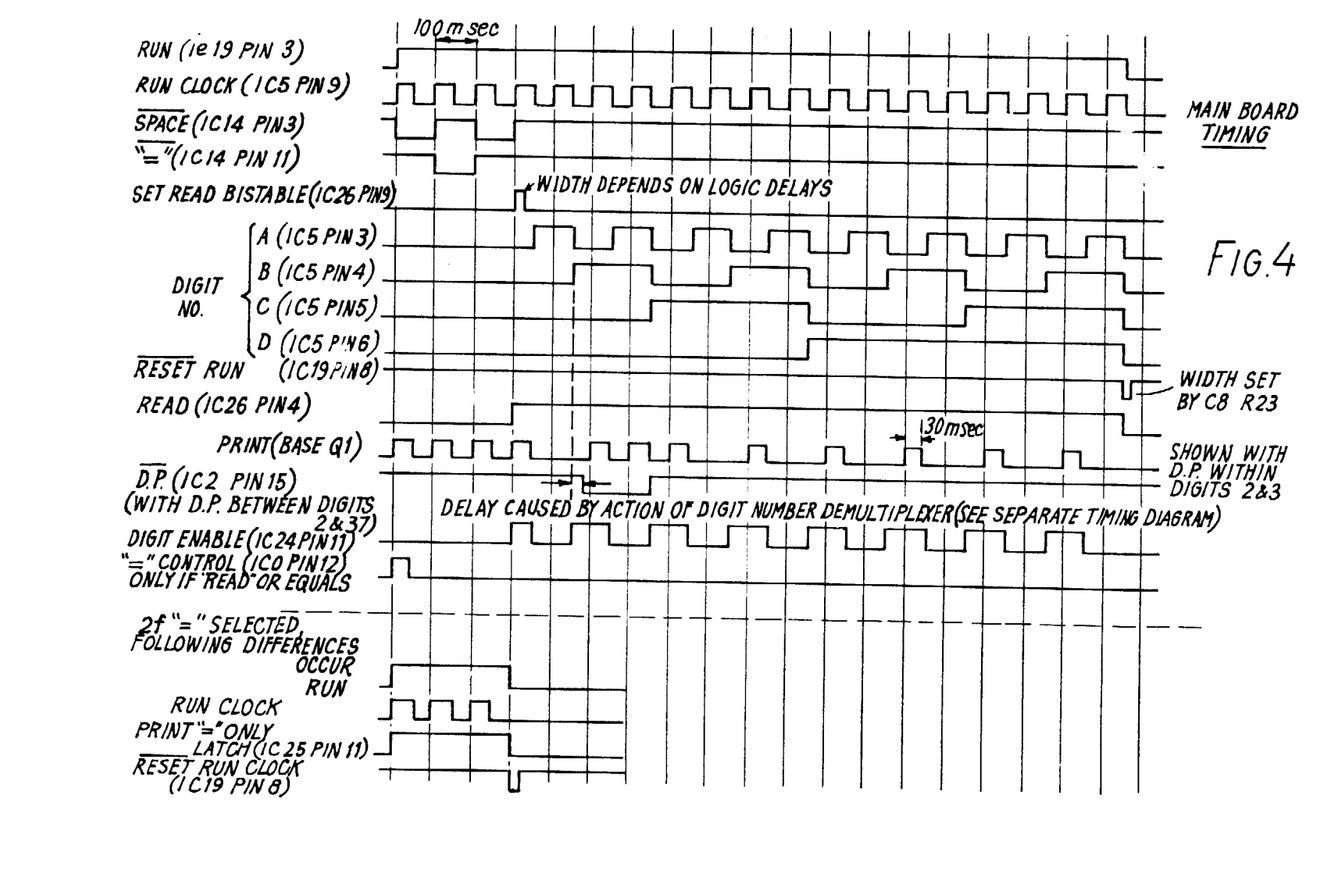
Figure 5:
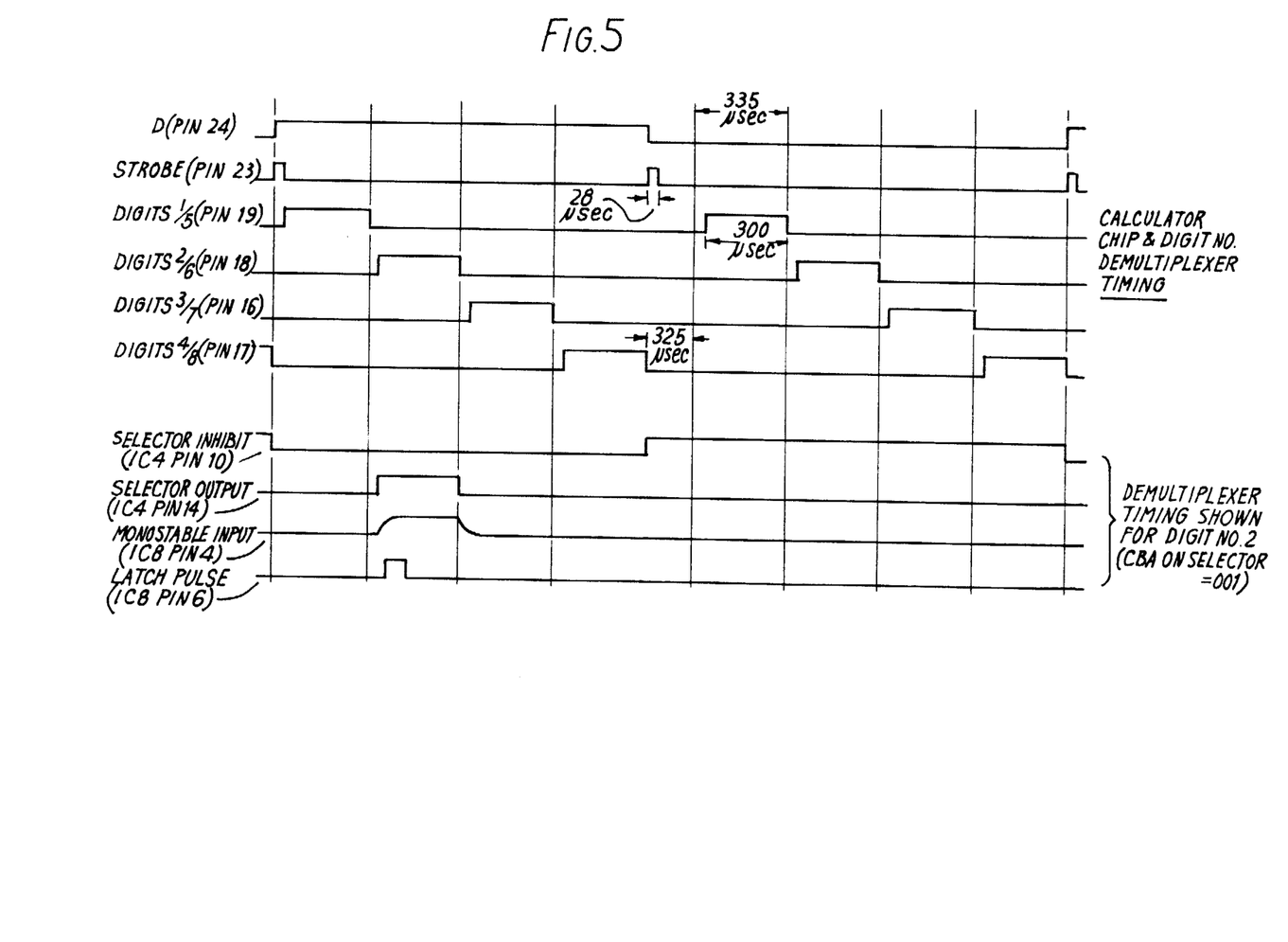

To assist a technician in checking the operation of the embodiment of FIGS. 2A to 2F pulse timing diagrams are given in FIGS. 4 and 5 with the pin numbers on the relevant IC's indicated.

I claim:

1. Apparatus comprising in combination an electric typewriter, an electronic calculator, a source of operator-selectable signals representative of alpha-numberic characters and operator-selectable signals representative of calculator command signals including at least the command signals "CLEAR", "+", "−", "X", "÷", "DECIMAL POINT" and "ANSWER", and control apparatus coupled to said source, said calculator and said typewriter, said source including a first code-converter to convert operator-selected alpha-numeric and calculator command signals into a secondary coded form, said typewriter including a second code-converter to convert signals in said secondary coded form into signals to operate said typewriter, and said control apparatus comprising a selector coupled on the one hand between the output of said first code-converter and the input of said second code-converter and on the other hand between the output of said calculator and the input of said second code-converter, said selector having a first normal setting in which signals from the output of the first code-converter are applied to the input of the second code-converter while preventing application of output from said calculator to the input of said second code-converter, and having a second setting selectable by said operator-selected "ANSWER" command signal to couple the output of said calculator to the input of said second code-converter and enabling the output from said calculator to be automatically typed by said typewriter, and said control apparatus further comprising means coupling the output of said first code-converter to a key-simulator responsible to said operator-selectable signals representative of numeric characters and calculator command signals as encoded by said first code-converter for simulating calculatorkey-signals and applying the last said signals to said calculator through connections individual to the digits φ and 1 through 9 and at least the command signals "DECIMAL POINT", "+", "−", "X", "÷", "CLEAR" and "=", whereby the conventional calculations of addition, subtraction, multiplication, and division can be effected under direct operator control and the result automatically typed when the "ANSWER" command signal is selected by the operator.

2. Apparatus according to claim 1, wherein said control apparatus includes a sequence controller, a circuit to apply said "ANSWER" command signal to said sequence controller, said sequence controller including means to generate five different control signals in response to said "ANSWER" command signal, means to apply a first of said control signals to said selector to set said selector to said second setting, means to apply a second of said control signals to said typewriter to enable said typewriter to type automatically, means to apply a third of said control signals to said typewriter to execute a space thereby, means to apply a fourth of said control signals to said typewriter to execute the typing of the = sign, and means to apply the fifth of said signals to activate said calculator to compute and provide an answer for typing by said typewriter.

3. Apparatus according to claim 2 and wherein said source also includes a source of an operator-selectable "READ" command signal, a circuit is provided for applying said "READ" command signal, when selected, to said sequence controller, and said sequence controller comprises means responsive to said "READ" command signal to generate all but said fifth control signal whereby the calculator is not enabled to compute, but whatever number is stored in its output is typed by said typewriter.

4. Apparatus according to claim 2, and wherein said source comprises a source of an operator-selectable "=" command signal, and means are provided for applying the "=" command signal to said calculator but not to said sequence controller whereby said calculator is enabled to compute without the selector being set to the second setting and hence without the result of the computation being typed.

* * * * *